UNITED STATES PATENT OFFICE.

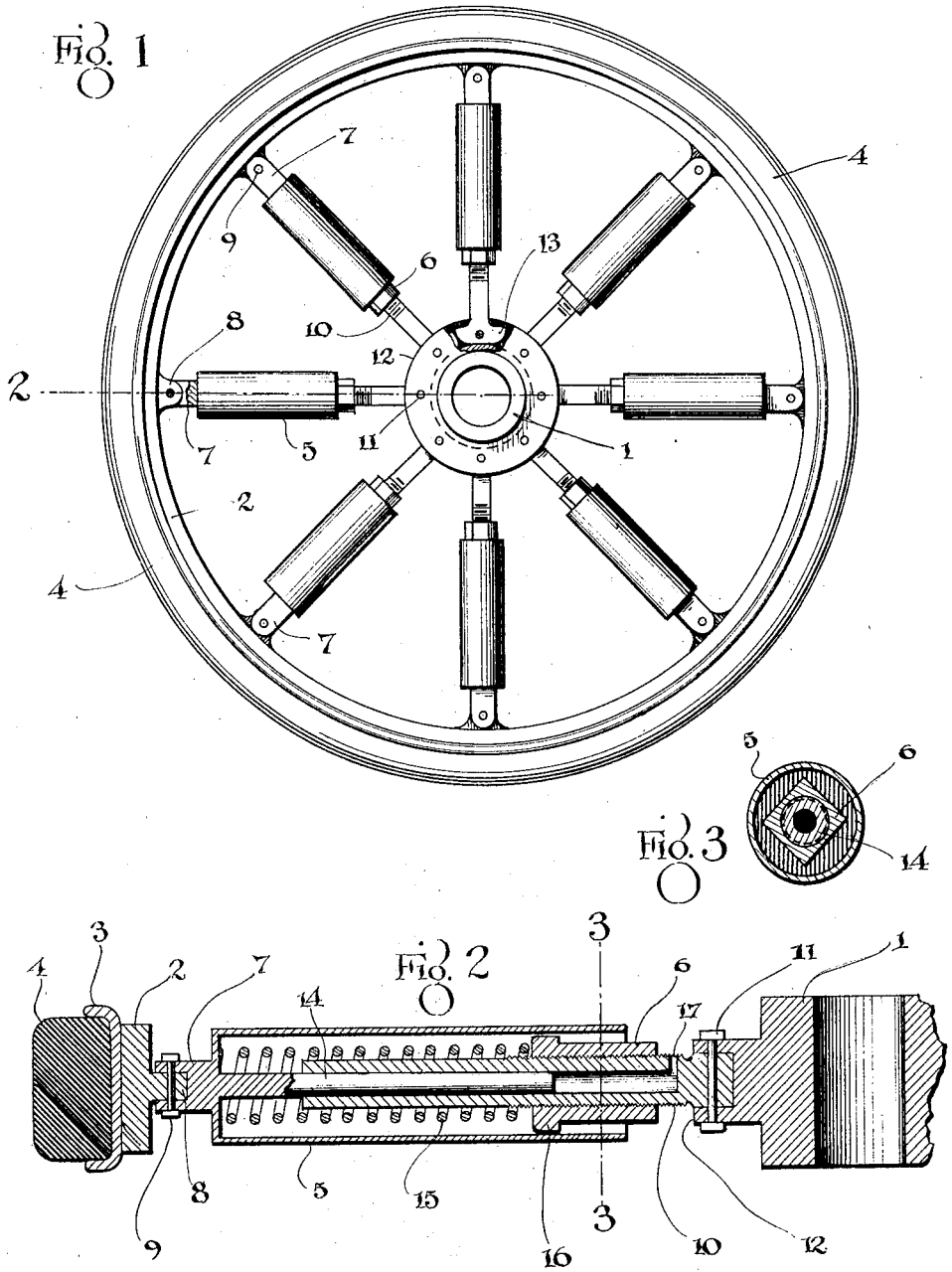

CLARENCE EMET WIGGINS, OF DELHI, LOUISIANA.

WHEEL.

1,403,824.        Specification of Letters Patent.      Patented Jan. 17, 1922.

Application filed August 27, 1920. Serial No. 406,372.

*To all whom it may concern:*

Be it known that I, CLARENCE EMET WIGGINS, a citizen of the United States, and a resident of Delhi, in the parish of Richland and State of Louisiana, have invented certain new and useful Improvements in Wheels, of which the following is a specification.

My invention is an improvement in wheels, and has for its object to provide a wheel especially adapted for use with automobiles, but capable of use in any vehicle, wherein the resiliency of a pneumatic tired wheel is obtained without the liability to puncture or other injury, the resiliency being provided by telescoping spokes which are normally spring supported.

In the drawings:

Figure 1 is a side view of the improved wheel with a part broken away,

Figure 2 is a section on the line 2—2 of Figure 1,

Figure 3 is a section on the line 3—3 of Figure 2.

In the present embodiment of the invention, the improved wheel comprises a hub 1, a felly 2 which carries a rim 3 and a tread 4, and a series of spokes connecting the hub and the rim. Each of these spokes consists of an outer section or casing 5 and an inner section or plunger 6.

The outer end of each casing 5 is closed, as shown, and the said outer end has a lug 7 which is notched to receive a lug 8 on the felly, and a bolt and nut 9 connect the lugs 7 and 8. The plunger 6 is a sleeve which is threaded onto a guide socket 10, the said guide socket being connected to the hub by means of a bolt and nut 11.

Referring to Figure 1, it will be seen that the hub has circumferentially extending flanges 12, between which cross heads 13 on the inner ends of the sockets are received, and the bolt is passed through the flanges and through the head. This socket is engaged by an axial rod 14 extending inwardly from the closed or outer end of the casing 5, and a coil spring 15 is arranged between the plunger 6 and the said closed end of the casing, the spring encircling the socket and the rod, and normally acting to press the plunger 6 which is the inner section, away from the casing 5, which is the outer section.

Referring to Figure 3, it will be seen that the plunger 6 is square in cross section, and has an enlargement or head 16 at its outer end which fits within the casing. The socket 10 has a lateral port 17 at the end adjacent to the hub, for permitting the egress and ingress of air.

In operation, the hub is normally held concentric with the felly. When the hub is moved eccentrically by shock or jar, this movement is resisted by practically all of the springs or all of the telescoping spokes. The springs below the hub are compressed, and those above the hub are expanded. Those which are lateral are expanded or contracted as the case may be. By turning the plunger on the socket the position of the plunger with respect to the casing and the tension of the spring 15, may be adjusted.

I claim:—

1. A wheel of the character described comprising a hub and a felly, and a series of spokes connecting the hub and felly, each of said spokes including an outer section comprising a casing closed at one end and having a lug extending exteriorly of said closed end and pivotally connected to the felly and a guide rod axially and rigidly arranged within the casing and terminating short of its open end, an inner section comprising a socket operating in the casing of the outer section and slidably receiving the guide rod and having a portion projecting from the open end of the casing, the end of the projecting portion having a cross head pivotally connected to the hub, and a plunger disposed partially within the casing and mounted entirely on the socket and adjustable thereon, said plunger including a sleeve having threaded engagement with the periphery of the socket and a head extending laterally and outwardly from the sleeve at one end thereof, the end of the sleeve remote from the head being squared and projecting from the casing to facilitate adjustment of the plunger and a spring arranged within the casing and embracing the socket and engaging the casing at one end and the head of the adjustable plunger at the other end.

2. A wheel of the character described including a hub and a felly and comprising a series of spokes connecting the hub and felly, each of said spokes including an outer section pivotally connected to the felly and comprising a casing closed at one end and a guide rod axially and rigidly arranged within the casing and terminating short of its open end, an inner section pivotally connected to the hub and comprising a socket operating in the casing of the outer section and slidably receiving said guide rod, a plunger disposed partially within the casing and mounted entirely on the socket and adjustable thereon, said plunger having a portion projecting from the casing to facilitate adjustment thereof on the socket, and a spring arranged within the casing embracing the socket and engaging the casing at one end and the adjustable plunger at the other end.

CLARENCE EMET WIGGINS.